(12) United States Patent  
Lee

(10) Patent No.: US 8,995,239 B2
(45) Date of Patent: Mar. 31, 2015

(54) RECORDING MEDIUM FOR LONG-TERM DATA RETENTION, RECORDING METHOD, AND RECORDING/REPRODUCING APPARATUS

(71) Applicant: Toshiba Samsung Storage Technology Korea Corporation, Suwon-si (KR)

(72) Inventor: Hyck-jin Lee, Seongnam-si (KR)

(73) Assignee: Toshiba Samsung Storage Technology Korea Corporation, Suwon-si (KR)

(*) Notice: Subject to any disclaimer, the term of this patent is extended or adjusted under 35 U.S.C. 154(b) by 38 days.

(21) Appl. No.: 13/713,423

(22) Filed: Dec. 13, 2012

(65) Prior Publication Data

US 2013/0155825 A1    Jun. 20, 2013

(30) Foreign Application Priority Data

Dec. 16, 2011 (KR) .................. 10-2011-0136570

(51) Int. Cl.
  *G11B 7/007*   (2006.01)
  *G11B 7/24024*   (2013.01)
(52) U.S. Cl.
  CPC ........... *G11B 7/00736* (2013.01); *G11B 7/007* (2013.01); *G11B 7/24024* (2013.01)
  USPC ..................................... 369/30.03

(58) Field of Classification Search
  CPC ................................. G11B 2020/1869
  See application file for complete search history.

(56) References Cited

U.S. PATENT DOCUMENTS

2007/0097808 A1*   5/2007   Maruyama et al. ........ 369/30.37

FOREIGN PATENT DOCUMENTS

| JP | 2001-243636 | 9/2001 |
| KR | 10-2006-0004853 A | 1/2006 |
| KR | 10-2006-0005208 | 1/2006 |
| KR | 10-0716966 | 5/2007 |
| KR | 10-2011-0014140 | 2/2011 |

OTHER PUBLICATIONS

Korean Office Action issued Mar. 29, 2013 in counterpart Korean Patent Application No. 10-2011-0136570 (4 pages, in Korean).

* cited by examiner

*Primary Examiner* — Thang Tran
*Assistant Examiner* — Mark Fischer
(74) *Attorney, Agent, or Firm* — NSIP Law

(57) ABSTRACT

Provided are recording media, recording/reproducing apparatuses, and recording methods for use in long-term data retention. Recording medium information may be copied and stored in a new information zone in a data area. Accordingly, if medium recognition of a lead-in area and/or a lead-out area fails, a recording medium may be recognized using the data recorded in the new information zone.

13 Claims, 6 Drawing Sheets

FIG. 3

|  | START RADIUS (mm) |
|---|---|
| Protection zone 1 | 22.200 |
| PIC | 22.512 |
| Protection zone 2 | 23.252 |
| INFO 2 | 23.289 |
| OPC | 23.329 |
| reserved | 23.647 |
| INFO 1 | 23.961 |
|  | 24.000 |
|  | 58.000 |
| Protection zone 3 | 58.017 |

LEAD-IN AREA: Protection zone 1, PIC, Protection zone 2, INFO 2, OPC, reserved, INFO 1

DATA AREA: 24.000

LEAD-OUT AREA: 58.000, Protection zone 3

RECORDING MEDIUM FOR LONG-TERM DATA RETENTION, RECORDING METHOD, AND RECORDING/REPRODUCING APPARATUS

CROSS-REFERENCE TO RELATED APPLICATION(S)

This application claims the benefit under 35 USC §119(a) of Korean Patent Application No. 10-2011-0136570, filed on Dec. 16, 2011, in the Korean Intellectual Property Office, the entire disclosure of which is incorporated herein by reference for all purposes.

BACKGROUND

1. Field

The following description relates to recording media, recording methods, and recording/reproducing apparatuses, and more particularly, to recording media, recording methods, and recording/reproducing apparatuses for long-term data retention.

2. Description of Related Art

Optical discs are recording media used for recording and retaining information. However, if data is retained over a long period of time, due to a reduction of the quality of an optical disc over time, data recorded and retained on an optical disc may be degraded or damaged and may not be backed up onto a new recording medium. Also, in some cases, optical discs produced by the same manufacturer may have different qualities, and thus, a backup time due to quality reduction of an optical disc may be missed.

Accordingly there is a desire for an optical disc to achieve data retention over a long period of time, in such a way that data retained for a long period of time remains readable.

SUMMARY

In an aspect, there is provided a recording medium including a lead-in area, a data area, and a lead-out area, wherein the data area comprises a non-recording zone allocated adjacent to at least one of the lead-in area and the lead-out area, and an information zone allocated at an inner side of the non-recording zone and toward a center of the data area, the information zone for recording information about the recording medium.

The non-recording zone may be allocated adjacent to each of the lead-in area and the lead-out area.

The information zone may be allocated at an inner side of the non-recording zone adjacent to the lead-in area.

The information zone may be allocated at an inner side of the non-recording zone adjacent to the lead-out area.

The information about the recording medium may be recorded in at least one of the lead-in area and the lead-out area and may also be copied and stored in the information zone.

The non-recording zone may cover about 30% of the recording medium from its inner and/or outer circumference.

The information zone may not be allocated in the 30% of the recording medium from its inner and/or outer circumference.

In an aspect, there is provided a recording/reproducing apparatus including an optical pickup configured to irradiate light onto a recording medium to record data thereon, a memory configured to store information about ranges of a valid data area and a new information zone of a recording medium, which are obtained in advance by performing a test, and a control unit configured to allocate a non-recording zone adjacent to at least one of a lead-in area and a lead-out area in a data area of a target recording medium, to allocate an information zone at an inner side of the non-recording zone toward a center of the data area, based on the information stored in the memory, and to control recording medium information to be recorded in the information zone.

The non-recording zone may be allocated adjacent to each of the lead-in area and the lead-out area.

The information zone may be allocated at an inner side of the non-recording zone adjacent to the lead-in area.

The information zone may be allocated at an inner side of the non-recording zone adjacent to the lead-out area.

The information about the recording medium may be recorded in at least one of the lead-in area and the lead-out area and may be copied to and stored in the information zone.

The non-recording zone may cover about 30% of the target recording medium from its inner and/or outer circumference.

In an aspect, there is provided a recording method including allocating a non-recording zone adjacent to at least one of a lead-in area and a lead-out area in a data area of a target recording medium, allocating an information zone at an inner side of the non-recording zone toward a center of the data area, based on ranges of a valid data area which are obtained in advance by performing a test and which is stored in a memory of the recording/reproducing apparatus, and recording information about the recording medium in the information zone.

The non-recording zone may be allocated adjacent to each of the lead-in area and the lead-out area.

The information zone may be allocated at an inner side of the non-recording zone adjacent to the lead-in area.

The information zone may be allocated at an inner side of the non-recording zone adjacent to the lead-out area.

The information about the recording medium may be recorded in at least one of the lead-in area and the lead-out area and may be copied and stored in the information zone.

The non-recording zone may cover about 30% of the target recording medium from its inner and/or outer circumference.

The information zone may not be allocated in the 30% of the target recording medium from its inner and/or outer circumference.

Other features and aspects may be apparent from the following detailed description, the drawings, and the claims.

BRIEF DESCRIPTION OF THE DRAWINGS

FIG. 3 is a diagram illustrating an example of a layout of a rewritable Blu-ray single layer or dual layer disc (BD-RE SL/DL) as an example of a disc-type recording medium.

Figure 1:
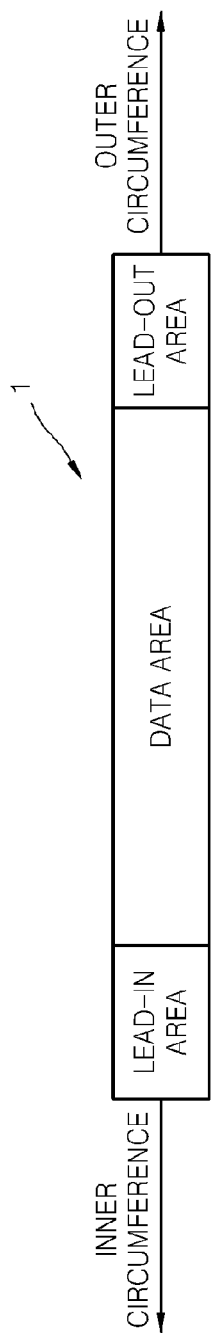
FIG. 1 is a diagram illustrating an example of a disc-type recording medium.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
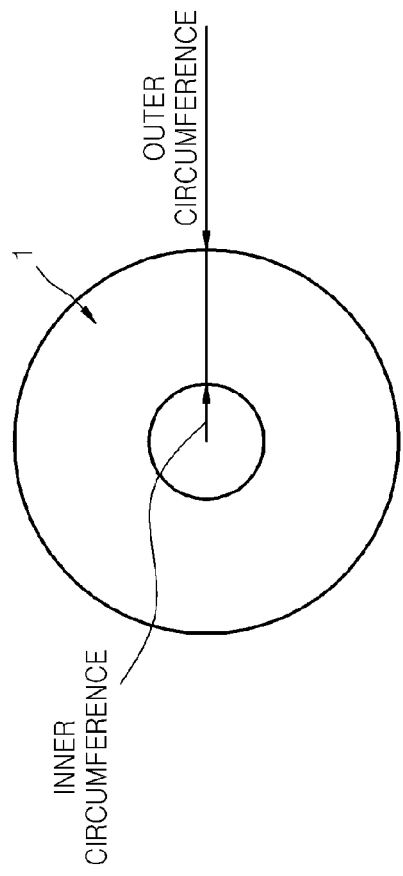
FIG. 2 is a diagram illustrating another view of a disc-type recording medium.

FIG. 1 illustrates an example of a disc-type recording medium 1. FIG. 2 illustrates another view of the disc-type recording medium 1.

Referring to FIGS. 1 and 2, from the inner circumference thereof the recording medium 1 includes a lead-in area, a data area, and a lead-out area. Information may be recorded on at least one of the lead-in area and the lead-out area, for example, the lead-in area.

FIG. 3 illustrates an example of a layout of a rewritable Blu-ray single layer or dual layer disc (BD-RE SL/DL) as an example of a disc-type recording medium in which information is recorded on a lead-in area.

Referring to FIG. 3, in the BD-RE SL/DL, an optimum power control (OPC) zone that is used to perform OPC is formed as a test zone in the lead-in area. A plurality of protection zones for protecting the recording medium 1 are formed in the lead-in area and the lead-out area. As an example, two protection zones may be formed in the lead-in area, and one protection zone may be formed in the lead-out area.

For example, permanent information and control data (PIC) zone and two information zones INFO 1 and INFO 2 may be formed in the lead-in area. Also, a zone adjacent to the OPC zone may be reserved as a reserved zone.

In this example, the protection zone that is formed closest to the inner circumference of the recording medium 1 in the lead-in area is referred to as protection zone 1, the protection zone that is formed closest to the outer circumference of the recording medium 1 in the lead-out area is referred to as protection zone 3, and the protection zone that is formed between the PIC zone and the information zone INFO 2 in the lead-in area is referred to as protection zone 2. In this example, the protection zone 2 may act as a buffer zone for a changeover between an embossed PIC zone and a recordable zone.

For example, in the lead-in area, the protection zone 1, the PIC zone, the protection zone 2, the information zone INFO 2, the OPC zone, the reserved zone, and the information zone INFO 1 may be formed in the descriptive order from the inner circumference of the recording medium 1.

A BD-RE SL may include a single recording layer that has the layout shown in the example of FIG. 3. A BD-RE DL may include two recording layers that have the layout shown in the example of FIG. 3. That is, in the BD-RE DL, layer 0 and layer 1 may have the layout shown in FIG. 3, and a zone closest to the inner circumference of the recording medium 1 in the lead-in area of the layer 0 may be formed as a burst cutting area (BCA) (not shown). The BCA may be used to record main information about the recording medium 1, for example, a serial number of the recording medium 1 and encryption information for preventing the recording medium 1 from being copied.

It should also be appreciated that the examples herein may be applied to triple layer discs, quadruple layer discs, and the like.

The PIC zone may be used to record disc management information as an embossed high frequency modulated (HFM) signal. The PIC zone may be used to record general main information of the recording medium 1 which needs to be permanently retained. The PIC zone may include HFM grooves for recoding disc information (DI). For example, the DI recorded in the PIC zone may include a DI identifier (ID), disc structure information, reproducing power information, and recording power information. The recording power information may include optical recording power information at a general recording speed, optical recording power information at a maximum recording speed, optical recording power information at a minimum recording speed, and the like, which may be used to adjust optical recording power.

During a recording operation, the optical recording power information recorded on the PIC zone may be read, optical power of a laser source included in an optical pickup may be variably adjusted using the read optical recording power information, and a recording operation may be performed on the recording medium 1. In addition to the above optical recording power information, optimum recording power may be detected by performing an OPC operation, and thus, the quality of the recording operation may be ensured.

The BD-RE SL/DL records data into grooves on a recording layer that has a land/groove structure. The grooves may be classified into HFM grooves and wobbled grooves. The wobbled grooves may be formed using various modulation methods, e.g., a method using minimum shift keying (MSK) modulation together with harmonic modulated wave (HMW) modulation (this is referred to as 'MSK+HMW modulation'), and a method using only MSK modulation. For example, the wobbled grooves may have a wobbled shape that is obtained by modulating the grooves of the recording layer based on a sinusoidal curve. Due to the wobbled shape, a system of an optical information storage medium may read address information of a corresponding groove (an address in pre-groove (ADIP)) and general disc information.

As an example, the protection zone 1 and the PIC zone in the lead-in area may be formed of HFM modulated grooves, the protection zone 3 in the lead-out area may be formed of wobbled grooves using MSK modulation, and the other zones in the lead-in area, the lead-out area, and the data area may be formed of wobbled grooves using MSK+HMW modulation.

Although FIG. 3 shows the recording medium 1 in which recording medium information is recorded in a lead-in area, it should be appreciated that the recording medium information is not limited thereto. For example, the recording medium information may be recorded in a lead-out area, a lead-in area, or in both a lead in area and a lead-out area. That is, the recording medium information may be recorded on one or both of the lead-in area and the lead-out area.

According to various accelerated degradation tests performed on a disc-type recording medium, an area of about 30% of the recording medium, from along its inner circumference and/or the outer circumference may oxidize easily due to, for example, penetration of moisture. As a result, a reduction in reflectivity thereon may be accelerated. The remaining portion of the recording medium rarely has such a problem. That is, although a recording medium is not produced particularly for long-term data retention, the remaining portion of the recording medium may not have a problem even when data is retained over a long period of time. Accordingly, when the size of a valid data area for long-term data retention is set by testing a safety area of a recording medium, even a general recording medium may be used for long-term data retention.

Figure 4:
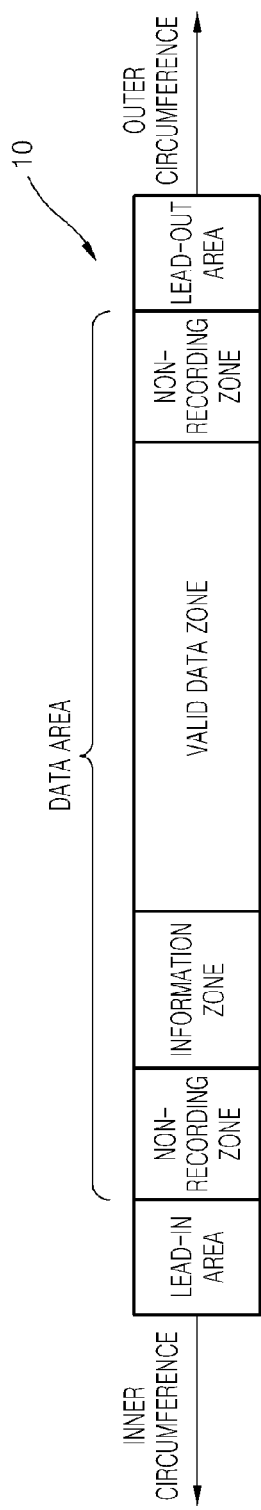
FIGS. 4 and 5 are diagrams illustrating additional examples of a disc-type recording medium.
Figure 5:
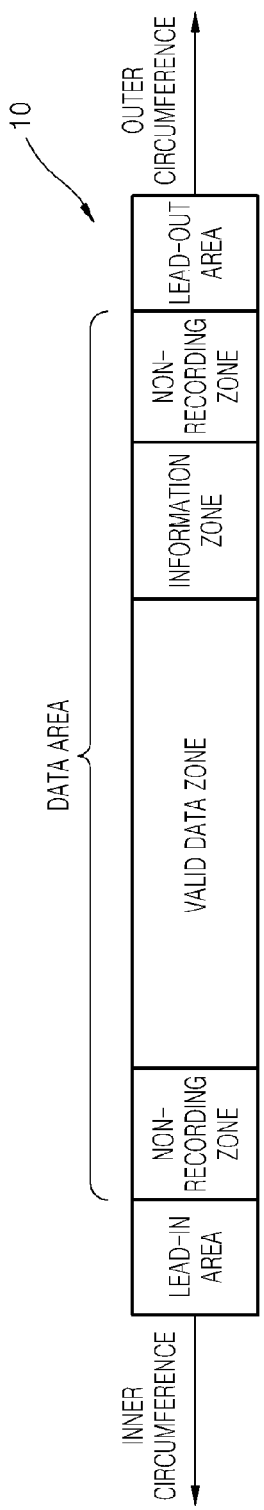

FIGS. 4 and 5 illustrate additional examples of a recording medium 10. Referring to FIGS. 4 and 5, like the recording medium 1 illustrated in FIG. 1, the recording medium 10 includes a lead-in area, a data area, and a lead-out area from its inner circumference. In the data area, the recording medium 10 also includes a new information zone for recording medium information to be retained over a long period of time. The recording medium information is also recorded on at least one of the lead-in area and the lead-out area, for example, the lead-in area.

In the recording medium 10, the data area includes a non-recording zone that is adjacent to at least one of the lead-in area and the lead-out area, and the new information zone for copying and storing the recording medium information that is recorded on, for example, the lead-in area and formed at an inner side of the non-recording zone toward the center of the data area. According to various aspects, the recording medium information may be recorded on the lead-out area as well as the lead-in area. For convenience herein, the recording information is recorded on the lead-in area.

FIG. 4 illustrates an example in which the non-recording zones are allocated at zones adjacent to the lead-in area and the lead-out area, respectively, and the information zone is allocated at an inner side of the non-recording zone adjacent to the lead-in area.

FIG. 5 illustrates an example in which the non-recording zones are allocated at zones adjacent to the lead-in area and the lead-out area, respectively, and the information zone is allocated at an inner side of the non-recording zone adjacent to the lead-out area.

As another example, the non-recording zone may be allocated at a zone adjacent to one of the lead-in area and the lead-out area, and the information zone may be allocated at an inner side of the non-recording zone. As another example, the non-recording zones may be allocated at zones adjacent to the lead-in area and the lead-out area, respectively, and the information zones may be allocated at inner sides of the non-recording zones adjacent to the lead-in area and the lead-out area, respectively.

The non-recording zone allocated in the data area may include a safety area which is a range from the inner and outer circumferences of the recording medium 10, in which deterioration may occur due to, for example, an external environmental factor. As an example, the non-recording zone may cover about 30% of the recording medium 10 from along its inner circumference and/or the outer circumference.

According to various aspects, the new information zone may be allocated at an inner side of the non-recording zone toward the center of the data area. The new information zone may used to record and store recording medium information. For example, the recording medium information recorded on at least one of the lead-in area and the lead-out area may be copied and stored in the information zone.

As described herein, because the recording medium information may be copied to and stored in the new information zone, when, for example, the lead-in area is not recognized, the information zone may be used to recognize the recording medium 10. That is, because the information zone may not deteriorate due to an environmental factor, e.g., penetration of moisture, even after a long period of time passes, the recording medium 10 may retain data over a long period of time. In contrast, in a general method in which only user data is recorded on the data area, if the lead-in area and/or the lead-out area are not recognizable, the recording medium 10 may not be read.

Figure 6:
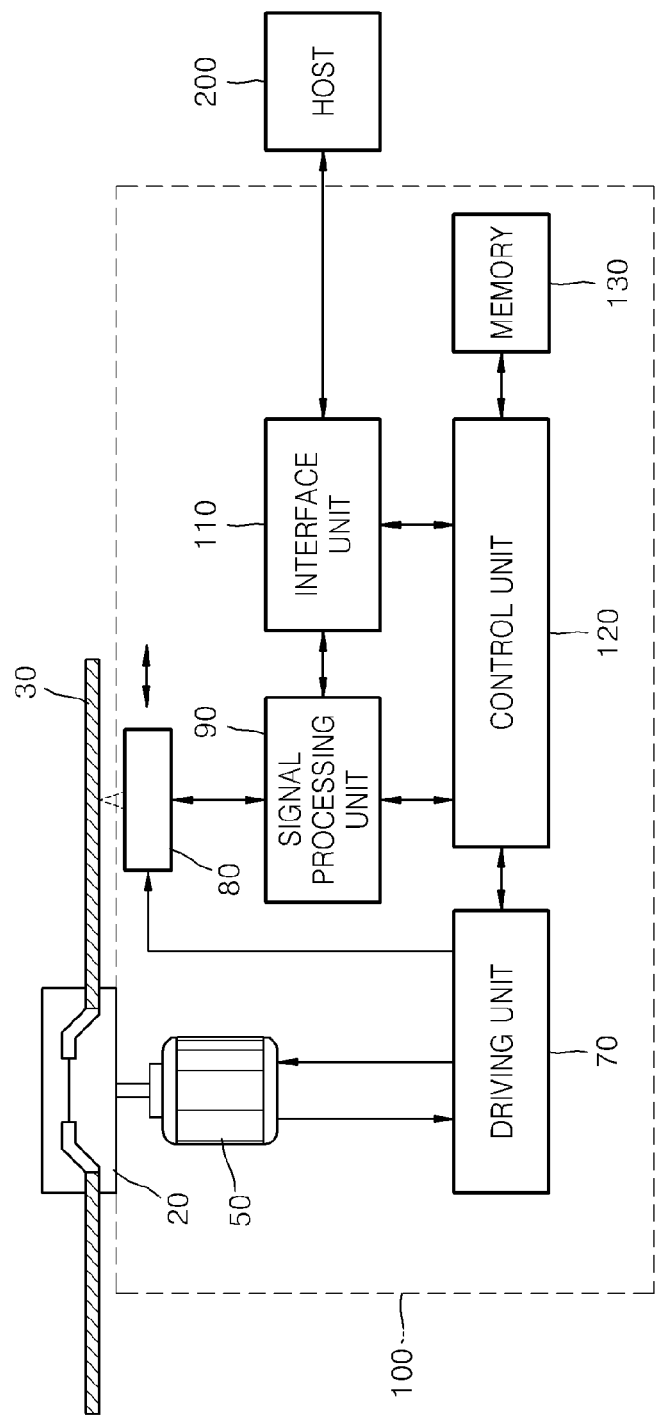
FIG. 6 is a diagram illustrating an example of a recording/reproducing apparatus.

FIG. 6 illustrates an example of a recording/reproducing apparatus 100.

Referring to FIG. 6, the recording/reproducing apparatus 100 includes an optical pickup 80, a memory 130, and a control unit 120. The recording/reproducing apparatus 100 may further include a signal processing unit 90, a driving unit 70, and an interface unit 110.

The optical pickup 80 may irradiate light onto a disc-type recording medium 30 to record data and may detect light reflected from the recording medium 30 to read data. For example, the optical pickup 80 may be an optical structure including a light source for emitting light used to record or reproduce data to or from the recording medium 30, an objective lens for focusing the light emitted from the light source onto the recording medium 30 mounted on a turntable 20, and an optical detector for detecting the light reflected from the recording medium 30 so as to detect a reproducing signal or an error signal for controlling a focusing servo, tracking servo, and the like. Basic optical configurations and operations of the optical pickup 80 are well known, and thus, detailed descriptions or illustrations thereof are not provided here.

Light emitted from the light source of the optical pickup 80 may be focused by the objective lens onto the recording medium 30 and then reflected therefrom. The light reflected from the recording medium 30 may be received and photoelectrically transformed by the optical detector of the optical pickup 80 into an electrical signal that may be processed by the signal processing unit 90.

A reproducing signal and/or an error signal for controlling a focusing servo, tracking servo, and the like, which may be obtained by the signal processing unit 90 as described above, may be input to the control unit 120.

The control unit 120 may generate a control signal for controlling tracking and focusing of the optical pickup 80, using the signal input from the signal processing unit 90. According to various aspects, a host 200 may command to retain data for a long time. In this example, the control unit 120 may allocate, in a data area of an object recording medium, a non-recording zone at an area adjacent to at least one of a lead-in area and a lead-out area of the recording medium 30, may allocate a new information zone at an inner side of the non-recording zone toward the center of the data area, based on information stored in the memory 130, and may control the optical pickup 80 to record recording medium information on the information zone.

If reading the recording medium information from, for example, the lead-in area of the recording medium 30, fails, the control unit 120 may control the optical pickup 80 to read the recording medium information from the new information zone. According to various aspects, when a recording operation is performed on the recording medium 30 for long-term data retention, the recording medium 30 may have the structure illustrated in the examples of FIG. 4 or FIG. 5, or the combined structure of FIGS. 4 and 5.

When data is reproduced, the signal processing unit 90 may receive a signal read by the optical pickup 80, and may restore the signal to a desired signal value. When data is recorded, the signal processing unit 90 may modulate data to be recorded into a signal recordable on the recording medium 30, and may transmit the signal to the optical pickup 80.

The memory 130 may store information about ranges of a valid data area and a new information zone included in the data area of each recording medium. The memory 130 may also function as a buffer for temporarily storing data to be recorded or reproduced. The valid data area is an area of the data area, which is not likely to be damaged due to an environmental factor, even over a long period of time, and may be a zone including or excluding the information zone.

The interface unit 110 may receive a recording or reproducing command of a user from the host 200 and may transmit the recording or reproducing command to the control unit 120 such that the control unit 120 may control each element of the recording/reproducing apparatus 100.

The driving unit 70 may drive the optical pickup 80 and control a rotation speed of a spindle motor 50, by the control of the control unit 120. A system may be configured to input the signal obtained by the signal processing unit 90 to the control unit 120 via the driving unit 70.

The host 200 may transmit the recording/reproducing command to the interface unit 110 of the recording/reproducing apparatus 100, and may control the overall system. For example, the host 200 may be a main controller of a computer, a server, an audio apparatus, a video apparatus, and the like. The recording/reproducing apparatus 100 may be an optical drive included in or a player not included in, for example, a personal computer. That is, the recording/reproducing apparatus 100 may be included in an optical drive which is included in a terminal, for example, a personal computer, a game console, a CD/DVD/BL player, an external player used as an individual product, and the like.

According to various aspects, information for notifying the host 200 about whether the recording/reproducing apparatus 100 supports a recording operation for long-term data retention may be added into a command such as an advanced technology attachment packet interface (APATI) command, and may be transmitted between the host 200 and the interface unit 110 of the recording/reproducing apparatus 100. For example, information indicating whether a recording operation for long-term data retention is supported may be added to a write parameter of a mode sense command and included in an ATAPI command.

In some aspects, information used by the host 200 to command the recording/reproducing apparatus 100 to perform a recording operation for long-term data retention may be added. For example, information representing whether to perform a recording operation for long-term data retention may be added to a write parameter of a mode selection command and included in an ATAPI command. Also, when the recording medium that has completed a recording operation is inserted into the recording/reproducing apparatus 100, information for notifying the host 200 that the inserted recording medium has performed the recording operation for long-term data retention may be added. For example, information for notifying the host 200 whether the inserted recording medium has performed a recording operation for long-term data retention may be added to a read disc information command and included in an ATAPI command.

Although the mode sense command, the mode selection command, and the read disc information command added to the ATAPI command are mentioned above as examples, it should be appreciated that other commands may also be used.

Figure 7:
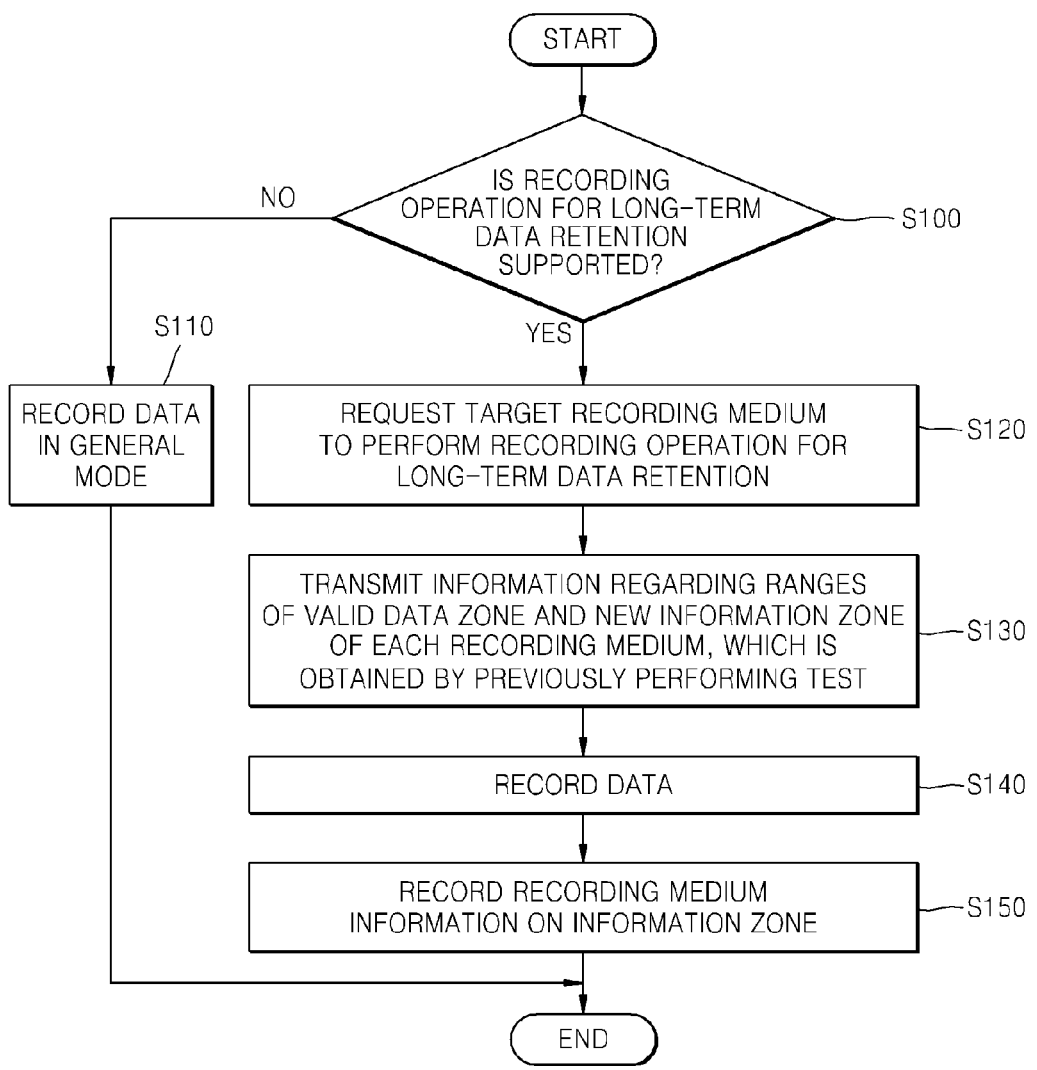
FIG. 7 is a diagram illustrating an example of a recording method.

FIG. 7 illustrates an example of a method of a recording operation for long-term data retention.

Referring to FIG. 7, initially, when a target recording medium is inserted into the recording/reproducing apparatus 100, the host 200 transmits a command to the recording/reproducing apparatus 100 to determine whether the recording/reproducing apparatus 100 supports a recording operation for long-term data retention (S100). For example, the target recording medium inserted into the recording/reproducing apparatus 100 may be a blank recording medium that has not been used for a recording operation and that is capable of being used at least once or more for a recording operation, or a recordable recording medium that has been used for a recording operation at least once. If the recording/reproducing apparatus 100 does not support a recording operation for long-term data retention, a recording operation is performed in a general recording mode (S110). For example, recording medium information may be recorded on a lead-in area, and user data may be recorded on a data area.

When it is determined that the recording/reproducing apparatus 100 supports a recording operation for long-term data retention, the host 200 transmits to the recording/reproducing apparatus 100 a command for requesting for a recording operation for long-term data retention on the target recording medium (S120). According to the command of the host 200, the recording/reproducing apparatus 100 receives information about ranges of a valid data area and a new information zone of each recording medium, which is obtained by previously performing a test and which is stored in the memory 130 (S130), and allocates a non-recording zone and the new information zone in a data area of the target recording medium, so as to perform a recording operation (S140).

During the recording operation, recording medium information may be recorded on, for example, a lead-in area and/or a lead-out area of the target recording medium. The recording medium information recorded on the lead-in area and/or the lead-out area of the target recording medium is copied to the information zone of the target recording medium (S150).

An area of the data area other than the non-recording zone and the information zone may be, for example, the valid data area. In this example, the user data is recorded on the valid data area. After the user data is recorded on the valid data area, the recording medium information may be recorded on the lead-in area and/or the lead-out area and may be copied to the information zone, or vice versa.

After a recording operation for long-term data retention is performed, information representing that this recording medium has performed a recording operation for long-term data retention, and information representing locations of the new valid data area and the new information zone may be added to the recording medium information recorded on the lead-in area and/or the lead-out area. For example, the above types of information may be added to the lead-in area and/or the lead-out area before the recording medium information is copied to the new information zone.

According to the above-described recording method, using a general recording medium not produced for long-term data retention, a recording operation for long-term data retention may be performed and data recorded on the recording medium may be retained for a longer period of time. Also, instead of expensive recording media produced particularly for long-term data retention, general recording media may be used for long-term data retention. In this case, although the valid data area may be reduced in comparison to a recording operation performed in a general mode, even after a long time passes, data recorded on the recording medium may be read.

Figure 8:
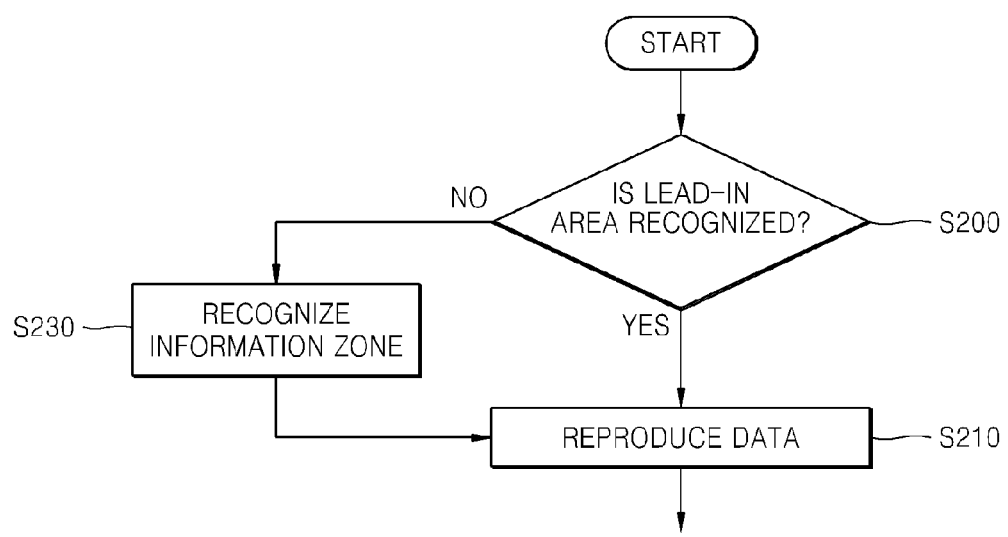
FIG. 8 is a diagram illustrating an example of a reproducing method.

FIG. 8 illustrates an example of a method for reproducing data which has been recorded for a long period of time.

Referring to FIG. 8, when a recording medium is inserted into the recording/reproducing apparatus 100, initially, a lead-in area is recognized (S200). When the lead-in area is recognized, and thus, recording medium information recorded on the lead-in area is read, a reproducing operation for reading user data recorded on a valid data area is performed (S210).

However, when the lead-in area is not recognized, the optical pickup 80 moves to recognize an information zone allocated in a data area (S230) which includes information about the information recording medium. When the information zone is recognized, and thus, recording medium information recorded on the information zone is read, the reproducing operation for reading the user data recorded on the valid data area is performed (S210).

As described above, recording medium information is copied to a new information zone in a data area. Accordingly, if medium recognition of a lead-in area and/or a lead-out area fails, a recording medium may be recognized using the new information zone.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A recording/reproducing apparatus comprising:
   an optical pickup configured to irradiate light onto a recording medium to record data thereon;
   a memory configured to store information of ranges of a valid data area and a second information zone of a recording medium, which are obtained in advance by performing a test; and
   a control unit configured to allocate a non-recording zone adjacent to one of a lead-in area and a lead-out area in a data area of a target recording medium, to allocate an information zone at an inner side of the non-recording zone toward a center of the data area, based on the information stored in the memory, and to control recording medium information to be recorded in the information zone.

2. The recording/reproducing apparatus of claim 1, wherein the non-recording zone is allocated adjacent to each of the lead-in area and the lead-out area.

3. The recording/reproducing apparatus of claim 2, the information zone is allocated at an inner side of the non-recording zone adjacent to the lead-in area.

4. The recording/reproducing apparatus of claim 2, wherein the information zone is allocated at an inner side of the non-recording zone adjacent to the lead-out area.

5. The recording/reproducing apparatus of claim 1, wherein the information about the recording medium is recorded in one of the lead-in area and the lead-out area and is copied to and stored in the information zone.

6. The recording/reproducing apparatus of claim 1, wherein the non-recording zone covers about 30% of the target recording medium from its inner and/or outer circumference.

7. A recording method comprising:
   allocating a non-recording zone adjacent to one of a lead-in area and a lead-out area in a data area of a target recording medium;
   allocating an information zone at an inner side of the non-recording zone toward a center of the data area, based on ranges of a valid data area which are obtained in advance by performing a test and which is stored in a memory of a recording/reproducing apparatus; and
   recording information of the recording medium in the information zone.

8. The recording method of claim 7, wherein the non-recording zone is allocated adjacent to each of the lead-in area and the lead-out area.

9. The recording method of claim 8, wherein the information zone is allocated at an inner side of the non-recording zone adjacent to the lead-in area.

10. The recording method of claim 8, wherein the information zone is allocated at an inner side of the non-recording zone adjacent to the lead-out area.

11. The recording method of claim 7, wherein the information about the recording medium is recorded in one of the lead-in area and the lead-out area and is copied and stored in the information zone.

12. The recording method of claim 7, wherein the non-recording zone covers about 30% of the target recording medium from its inner and/or outer circumference.

13. The recording method of claim 12, wherein the information zone is not allocated in the 30% of the target recording medium from its inner and/or outer circumference.

* * * * *